United States Patent [19]

McReynolds

[11] Patent Number: 5,068,139

[45] Date of Patent: Nov. 26, 1991

[54] COMPOSITE PAPER REINFORCED THERMOPLASTIC ARTICLE

[75] Inventor: Kent B. McReynolds, Midland, Mich.

[73] Assignee: The Dow Chemical Company, Midland, Mich.

[21] Appl. No.: 436,525

[22] Filed: Nov. 14, 1989

Related U.S. Application Data

[63] Continuation-in-part of Ser. No. 273,546, Nov. 21, 1988, Pat. No. 4,937,145.

[51] Int. Cl.$^5$ .................. B32B 27/36; B32B 18/00; D21H 5/18
[52] U.S. Cl. ........................ 428/215; 428/325; 428/327; 428/513; 428/412; 428/286; 428/290; 428/408; 428/479.6; 428/512; 428/514; 162/156
[58] Field of Search .............. 428/513, 327, 325, 215

[56] References Cited

U.S. PATENT DOCUMENTS

| | | | |
|---|---|---|---|
| 4,044,188 | 8/1977 | Segal | 428/284 |
| 4,225,383 | 9/1980 | McReynolds | 162/145 |
| 4,784,906 | 11/1988 | Akao | 428/513 |
| 4,830,928 | 5/1989 | Tamagawa et al. | 428/513 |

*Primary Examiner*—P. C. Sluby
*Attorney, Agent, or Firm*—James B. Guffey

[57] ABSTRACT

A multilayered structural article having improved resistance to delamination and having a reduced coefficient of linear thermal expansion (CLTE) relative to that of the thermoplastic resin(s) employed in its preparation comprises a core layer of a highly filled composite paper having outer layers of thermoplastic resin adhered thereto.

20 Claims, No Drawings

COMPOSITE PAPER REINFORCED THERMOPLASTIC ARTICLE

CROSS-REFERENCE TO RELATED APPLICATION

This application is a continuation-in-part of copending application Ser. No. 273,546 which was filed on Nov. 21, 1988 and which issued as U.S. Pat. No. 4,937,145 on June 26, 1990.

BACKGROUND OF THE INVENTION

The present invention relates generally to a thermoplastic material reinforced with a highly filled composite core layer. The reinforced thermoplastic material is a multilayer structure which comprises a reinforcing core layer and two outer layers of a thermoplastic resin adhered either directly or indirectly to said core layer. The reinforced thermoplastic material may be used, for example in the form of flat sheets, in construction and manufacturing to provide a flat rigid outer surface for various appliances, building panels, vehicles, etc. or may be initially prepared in the form of, or subsequently fabricated into, a variety of shaped articles.

In U.S. Pat. No. 4,044,188 there is disclosed a stampable thermoplastic sheet material reinforced with a central core of a multi-length fiberglass mat. A highly loaded thermoplastic resin also containing short reinforcing fibers in the form of a sheet material is laminated to both major surfaces of a glass mat or its equivalent to fuse and laminate the two sheets and the glass fiber web or mat into an integral sheet construction. Disadvantageously, the previously known structural sheet materials disclosed in the foregoing patent have been found to possess undesirable features. In particular, in applications involving thermocycling wherein the structural sheet material is repeatedly exposed to extreme low temperatures followed by heating to elevated temperatures, the highly expandable thermoplastic layers exert sufficient stress that failure of the central core layer and/or delamination is often the result.

An additional problem associated with structures of the prior art is the tendency of the resin to migrate into the glass mat under molding conditions thereby producing an undesirable surface appearance. To overcome this tendency various fillers may be included into the resin in order to increase the melt viscosity thereof. Disadvantageously the addition of such fillers can adversely affect the physical properties of the thermoplastic layer particularly the impact strength thereof. Also this procedure does not solve the fundamental problem of glass mat layer failure.

While it might be thought possible to control the thermal expansion characteristics of a thermoplastic resin by including reinforcing fibers in the resin itself, such approach has not proven effective in practice. The presence of fibers in the resin layer may generate undesired surface asthetics and cause a reduction in impact strength.

Composite papers are previously known in the art. A suitable technique for their preparation has been disclosed and claimed in U.S. Pat. No. 4,225,383. One commercial use for composite paper is as the backing layer of vinyl flooring materials. In these materials one surface of the composite paper is coated with a polyvinylchloride resin layer.

It would be desirable if there were provided improved reinforced thermoplastic articles having improved resistance to failure due to thermal cycling and having improved dimensional stability. Further, it would also be desirable if such features could be achieved without the attendant substantial adverse effects on impact strength and/or other significant physical properties which are conventionally associated with the use of relatively high loadings of inorganic fibers and/or fillers within various known thermoplastic resin compositions.

SUMMARY OF THE INVENTION

According to the present invention, there is now provided a multilayer structural article comprising a composite paper core layer having two major surfaces and having a thermoplastic polymer layer adhered to each major surface thereof, said thermoplastic polymer layers each comprising one or more thermoplastic polymers that may optionally contain up to about 25 weight percent, based upon the weight of said thermoplastic polymer, of inorganic fibrous or particulate reinforcing or filler material; provided further that the ratio of the coefficient of linear thermal expansion (CLTE) of one of the thermoplastic polymer layers divided by the coefficient of linear thermal expansion of the other thermoplastic polymer layer is in the range of 0.85 to 1.15 and that the composite paper core layer of said article has a resistance to delamination of 0.2 lbs/in (35 N/m) or greater.

In one of its preferred embodiments, the present invention is a three layer structural sheet material comprising a central core layer comprising a composite paper having two major surfaces, and two outer surface layers adhered to both major surfaces of the central core layer, said outer surface layers each comprising a thermoplastic resin that is devoid of reinforcing fibrous or filler material; provided further that the ratio of the linear coefficient of thermal expansion of one surface layer thermoplastic resin divided by the linear coefficient of thermal expansion of the other surface layer thermoplastic resin is in the range of 0.95 to 1.05; and the composite paper has a density from 20 to 250 lbs/ft$^3$ (320 kg/m$^3$ to 4000 kg/m$^3$), a tensile strength at room temperature of at least 200 lbs/in$^2$ (9.58 kPa), a resistance to delamination of 0.57 lbs/in (100 N/m) or greater, and a Tabor Stiffness [normalized to a 0.03 (0.76 mm) inch thickness value] of from 20 to 250.

The indicated multilayered structural articles are particularly beneficial in that they exhibit substantially reduced coefficients of linear thermal expansion relative to that of the thermoplastic polymer compositions which are employed as the surface layers in the preparation thereof. Moreover, said articles also exhibit or retain substantially better physical properties such as, for example, impact strength than would be the case if a comparable amount of inorganic filler material (i.e., as is contained within the composite paper core layer) were simply homogeneously distributed throughout a single layer of the thermoplastic polymer in question. Furthermore, when the CLTE values and thicknesses of the opposing thermoplastic polymer layers are properly balanced as is hereinafter more fully discussed, the resulting articles are resistant to shape distortion (e.g., warping, bowing, etc.) upon thermal cycling exposure.

DETAILED DESCRIPTION OF THE INVENTION

The term "composite paper" as used herein refers to a highly filled, non-woven fibrous sheet material containing a water dispersible fiber, a film forming water insoluble organic polymer, an inorganic filler and, optionally, a non-fibrous organic filler. A sheet is prepared by providing an aqueous dispersion of the components, colloidally destabilizing the resulting mixture to form a fibrous agglomerate in aqueous suspension, distributing and draining the aqueous suspension to form a wet web and thereafter drying the web. Suitable fibrous materials include any natural or synthetic water dispersible fiber or blend of such fibers. Water dispersibility may be provided by a small amount an anionic or hydrophylic group added to such fibers to make them water dispersible. Examples of suitable fibers include natural materials such as wood pulp, linen, or cotton fibers. Glass fibers, synthetic polymeric fibers such as polyethylene, polyester, nylon, etc. may also be employed. Preferred are a mixture of cellulosic fibers with a small amount, up to 10 or 15, more preferably up to 5 percent by weight, of glass fibers. A suitable technique for preparing composite papers is disclosed in previously mentioned U.S. Pat. No. 4,225,383 the teachings of which are incorporated herein in their entirety by reference.

Suitable film forming water insoluble organic polymers for use in preparing the above-described composite paper compositions include latexes of natural and synthetic rubbery polymeric materials the particles of which coalesce to form a continuous film upon drying at normal room temperature and/or at the temperatures employed in preparing the composite paper. Examples of such materials include natural rubber or synthetic polymers of conjugated dienes such as butadiene or isoprene optionally with additional comonomers such as styrene, acrylonitrile, vinylidene chloride, ethylenically unsaturated carboxylic acids, and the like; acrylate rubbers such as homopolymers and copolymers of butyl acrylate, 2-ethylhexyl acrylate, and the like; butyl rubbers, etc. Especially preferred for use as the film forming, water insoluble polymer when reduced flammability and/or flame barrier properties are desired are latexes of conjugated diene/vinylidene chloride copolymers.

Suitable non-fibrous inorganic fillers for use in the composite paper include particulate inorganic materials such as talc, calcium carbonate, alumina trihydrate, clay, fumed silica, magnesium hydroxide, conductive fillers such as metal filings, conductive carbons, etc. Suitable organic filler materials for use in the composite paper hereof include particulated (e.g., powdered) organic resins including thermosetting or thermoplastic resins. Especially preferred organic polymers for use in this regard are thermoplastic polymers such as polyethylene, polypropylene, polyesters polystyrene, etc. The previously mentioned fillers also encompass colorants and pigments.

Preferred composite papers for use herein include those which comprise, on a total composite paper weight basis, (a) from about 1 to about 30 (preferably from about 5 to about 15) weight percent of a water dispersible organic (preferably cellulosic) fiber which does not melt or decompose at the temperatures employed during the preparation of said composite paper nor at the temperature employed to prepare and/or to form or fabricate the multilayer articles hereof, (b) from about 2 to about 30 (preferably from about 5 to about 15) weight percent of the indicated water-insoluble, film forming organic polymer and (c) from about 60 to about 95 (preferably from about 75 to about 90) weight percent of one or more of the aforementioned a particulate, nonfibrous inorganic filler ingredients.

In certain instances, the multilayer structural article to be prepared hereunder is a flat sheet material which is ultimately intended for use in a thermoforming or similar fabrication operation to prepare a three dimensionally formed or shaped finished product. In such instances, it is generally preferred that the aforementioned preferred composite paper composition further comprise, on a total composite paper weight basis, from about 1 to about 30 (preferably from about 3 to about 15) weight percent of a normally (i.e., at normal room temperature) solid thermoplastic polymer (in particulate or fibrous form) which has a softening and/or melting point below the temperature which is employed in the aforementioned thermoforming operation. The inclusion of such thermoplastic polymer ingredient within said composite paper has been found to substantially improve the thermoformability of the indicated multilayered sheet material. Especially preferred thermoplastic polymers for use in this regard include polyethylene, polypropylene, polyesters and polystyrene.

It is also preferred in some instances to incorporate a minor amount (e.g., from about 0.1 to about 15, preferably from about 0.5 to about 10 and most preferably from about 1 to about 5 weight percent on a composite paper total weight basis) of an inorganic fibrous material (especially glass fiber) within the above-described preferred composite sheet material composition.

The resistance to delamination of the composite paper core layer provides the necessary internal strength to resist separation of the invented structure upon generation of heat cycling induced stresses therein. Delamination strength is measured by 180° pull testing using an Instron ™ or similar testing machine. Preferred are structures wherein said composite paper core layer has a resistance to delamination of at least 0.3 lbs/in (52.4 N/m), more preferably at least about 0.5 lbs/in (87.3 N/m) especially at least 0.67 lbs/in (117 N/m) and most preferably at least about 1 lb/in (175 N/m). Naturally, the relatively higher delamination resistance values are especially applicable in instances wherein relatively thick thermoplastic polymer outer layers are to be employed and/or wherein thermoplastic polymers having relatively high inherent CLTE values are to be utilized for said outer layers.

The resistance to delamination value exhibited by the composite paper material itself (i.e., as determined by testing the composite paper per se prior to its incorporation into the subject multilayer structure) may or may not be the same as the value exhibited by the composite paper core layer following the preparation and/or fabrication of the multilayer structure in question. Thus, for example, in those instances wherein the composite paper employed contains normally solid thermoplastic fiber or filler materials which soften or melt at or below the temperature employed to manufacture, fabricate and/or thermoform the multilayer structure of interest, the composite paper core layer will generally exhibit a higher delamination resistance value within the resulting multilayer structure than that of the composite paper starting material. On the other hand, in those instances wherein relatively high lamination and/or forming pressures are employed and wherein the composite paper employed has relatively little elastic or thermoplastic character, the composite paper can be partially crushed during the lamination and/or forming operation and may exhibit a lower delamination resistance value within the finished article than it did in the form of the composite paper starting material. With the foregoing considerations in mind, it can nonetheless be stated as a general rule that composite papers which are preferred for use herein are those exhibiting delamination resistance values, in composite paper per se form, which generally correspond to the generally applicable and preferred values set forth above relative to the composite core layer of the finished multilayered structural article.

In connection with the foregoing, it will of course be well recognized by those skilled in the art that the desired structural integrity of the subject multilayered articles further requires that the individual layers thereof be bonded together with sufficient adhesive strength to resist the aforementioned heat cycling induced stresses. Accordingly, it will be similarly recognized that the bond strengths between said individual layers should be such that interlayer adhesion at all of the layer-to-layer interfaces within the structures of interest will be at least equal to the delamination resistance value of the composite paper core layer employed therein.

Improved resistance to structural failure of the composite paper core layer and resistance to delamination is also generally observed utilizing composite papers having relatively higher densities. On the other hand, extremely high density papers are troublesome and expensive to manufacture. Accordingly, the composite paper hereof generally has a density of from about 30 to about 150 (480 to 2400 kg/m$^3$) more preferably from 40 to 120 lbs/ft$^3$ (640 kg/m$^3$ to 1920 kg/m$^3$), and most preferably 45 to 100 lbs/ft$^3$ (720 kg/m$^3$ to 1600 kg/m$^3$).

The composite paper core layer employed herein typically has a Tabor Stiffness value [normalized to a composite paper sample thickness of 0.03 inch (0.76 mm)] in the range of from about 20 to about 500. Naturally, the non-normalized Tabor Stiffness values as measured for composite paper samples having thicknesses greater than 0.03 inch [and as exhibited by core layers used having thicknesses in excess of 0.03 inch (0.76 mm)] can be substantially in excess of the aforementioned 500 value. Preferred composite papers for use herein generally have 0.03 inch (0.76 mm) normalized Tabor Stiffness values in the range of from about 50 to about 350, more preferably from about 50 to about 250.

As is taught in Column 23 of U.S. Pat. No. 4,225,383, the as-measured Tabor Stiffness value of a composite paper sample of any given thickness can be conveniently normalized to a 30 mil (0.03 inch) thickness value by multiplying the measured value by the following factor:

$$\frac{(30)^3}{(\text{Thickness of the as-measured sample})^3}$$

The tensile strength of the composite paper employed herein is typically at least about 200 lb/in$^2$ (9.58 kPa) and is preferably at least about 500 lb/in$^2$ (24 kPa) and most preferably at least about 800 lb/in$^2$ (38.3 kPa).

The thermoplastic resins employed in the preparation of the outer surface layers suitably comprise any thermoplastic resin which may be adhered to the composite sheet core layer. Examples include the well known styrenic resins such as polystyrene and rubber modified polystryrene; styrene acrylonitrile (SAN) copolymers and rubber modified styrene acrylonitrile copolymers such as butadiene rubber modified SAN copolymers (ABS), ethylene/propylene or ethylene/propylene/diene rubber modified SAN copolymers (AES) and acrylate rubber modified SAN copolymers (ASA); polyvinylchloride; nylon; polycarbonate; olefinic thermoplastic polymers such as polyethylene, polypropylene, etc.; as well as blends of the foregoing. In addition to the thermoplastic resin, conventional additives and adjuvants may be included such as plasticizers, colorants, pigments, antioxidants, U.V. stabilizers, etc. Additionally (and as has been noted above), particulate or fibrous inorganic filler or reinforcing agents can also be suitably included in amounts up to about 25 (preferably up to about 15 or 20) weight percent on a thermoplastic polymer weight basis. Examples of suitable organic materials for use in this regard include talc, clay, calcium carbonate, silica, magnesium hydroxide, metal powders, glass fibers, metal fibers, carbon fibers, carbon powder, and the like.

One important criterion of the present invention is that the coefficient of linear thermal expansion (CLTE) of the two opposing thermoplastic polymer layers be relatively evenly matched with each other such that the ratio of the CLTE value for one of such layers to that of the other is from 0.85 to 1.15. Preferably such ratio is from 0.95 to 1.05, more preferably from 0.97 to 1.03 and most preferably from 0.99 to 1.01. If such criterion is not satisfactorily met within the multilayer structures of concern, then said structures may be subject to unacceptable warpage, deformation, bowing and/or curling and the like either during the course of the manufacture thereof and/or during subsequent thermal cycling exposure.

In view of the foregoing, it is generally preferred to either employ the same thermoplastic polymer composition for both of the surface layers of the structural article of interest or to at least carefully match the CLTE's of the selected polymer materials in those cases where different polymer compositions are to be employed for the respective polymer surface layers.

In certain instances, it is advantageous or desirable for economic or other reasons to employ multilayered polymer films or sheets (i.e., containing 2 or more distinct layers of different thermoplastic polymer compositions) as the thermoplastic polymer layer on one or both sides of the composite paper core. In such instances, it has been found that it is not necessary that the various polymer layers within said multilayer polymer films or sheets have the same or even similar CLTE values. Instead, it has been found that it is sufficient (i.e., for the purpose of avoiding thermal curling, warping etc.) that the average (e.g., the weighted average) or overall CLTE value (i.e., for the multilayered polymer sheet or film taken as a whole) for a multilayer polymer sheet or film on one side of the structure be within the above stated CLTE ratio range relative to the overall (or weighted average) CLTE value for the polymer film or sheet material employed on the other side of said structure.

In the foregoing regard, it has also been found that it is not absolutely necessary (although it is generally preferred) that the multilayered articles hereof having multilayered polymer films on both sides of such articles be arranged in a symmetrical fashion. Thus, even in cases wherein the CLTE values are substantially different between the individual polymer layers of a given multilayered polymer film or sheet structure of concern, it has been found to be possible, without encountering unacceptable thermal warping or buckling tendencies, to arrange said film or sheet structures unsymmetrically in the sense that the relatively higher CLTE side of one of said film or sheet structures can be the outermost layer on one side of the overall reinforced structural article and the relatively lower CLTE side of the other film or sheet structure can be the outermost layer on the other side of said article. A specific exemplification of such an unsymmetrical structure (in the form of a 5-layered structural sheet material) is described within Example 12 hereof.

In preparing the multilayer structural articles hereof, the thermoplastic layers may be adhered to the composite paper core layer by use of an adhesive layer which may be either a thermoplastic melt extrudable adhesive resin, a conventional aqueous or solvent dispersed adhesive resin or a thermosetting adhesive resin. Preferably, however, the thermoplastic layers are merely adhered to the reinforcing composite paper core layer by contacting the same while in a molten or semi-molten state such as for example via well known film or sheet laminating techniques or conventional extrusion coating operations. These latter techniques are referred to herein as heat lamination. In an alternative embodiment a one surface layer of thermoplastic resin can be heat laminated to one surface of a composite paper sheet and thereafter two such similarly prepared sheets can be adhesively joined at the composite paper interface.

An especially desirable method of continuously producing the composite structural sheet material of the present invention is by the continuous extrusion/lamination method. Using such a method, two layers of one or more plied thermoplastic sheeting are prepared by extrusion or other suitable method. The composite paper is then fed between the two thermoplastic sheets and a proper combination of heat and pressure (supplied by laminating rolls or the like) is then used to fuse and laminate the two sheets and the composite paper core into an integral sheet construction. The above technique can be the same as is employed in the preparation of the thermoplastic sheet material disclosed in U.S. Pat. No. 4,044,188, and the teachings therein are incorporated herein in their entirety by reference.

The various layers of the multilayer structural articles hereof may vary in thickness in order to provide a particular set of desired properties in a given instance. Generally, each outer thermoplastic layer may individually be from about 0.1 mm to about 5 mm (about 4 to about 200 mils) in thickness, preferably from about 0.1 to about 2.5 mm (about 4 to about 100 mils), more preferably from about 0.1 to about 1.5 mm (about 4 to about 60 mils) and most preferably from about 0.1 to about 0.75 mm (about 4 to about 30 mils) in thickness. In those instances where the multilayer article of concern is intended for use at relatively low temperatures and wherein low temperature impact resistance is required, it is generally preferred to employ polymer layers that are each at least about 0.5 mm (about 20 mils) in thickness.

In some instances, it may be desirable that the opposing thermoplastic surface layers of the subject multilayer structures be identical or substantially the same in thickness. However, such is not a general or mandatory requirement for the purposes of the present invention. To the contrary, in fact, in certain instances it is definitely preferable that the indicated thermoplastic polymer surface layers be intentionally "mismatched" in regard to their respective thicknesses.

With regard to the foregoing, it has been found that when the thermoplastic polymer compositions employed in the opposing surface layers are very closely matched in regard to their respective CLTE values (e.g., exhibiting a CLTE ratio in the range of from 0.95 to 1.05, more preferably from 0.97 to 1.03 and especially from 0.99 to 1.01) then it is preferred that said opposing thermoplastic polymer surface layers be substantially the same in thickness in order to avoid or minimize any tendency of the resulting multilayered structure to warp, buckle or bow upon thermal cycling exposure.

On the other hand, it has also been observed that when the relative CLTE ratio as between the respective polymer compositions of the opposing surface layers is outside the indicated 0.95 to 1.05 range (being, for example in the 0.85 to 0.95 or the 1.05 to 1.15 range), then it is preferred to employ the respective surface layers in different thicknesses relative to each other in order to reduce or minimize the tendency of the resulting multilayer structural article to warp, bow or buckle upon thermal cycling exposure. In this latter regard, it has also been observed to be beneficial for accomplishing the indicated objective to generally employ that polymer composition which exhibits the relatively higher CLTE value as a relatively thinner surface layer in comparison to the thickness of the relatively lower CLTE polymer composition of the opposing surface layer. Thus, when the relative CLTE values of the opposing polymer surface layers are not very closely balanced, then it is generally preferred to employ a sufficiently thinner (i.e., in comparison to the thickness of the opposing lower CLTE value polymer surface layer) surface layer of the relatively higher CLTE material to avoid significant or substantial deformation (e.g., buckling, bowing, warping, etc.) of the resulting multilayer structure during thermal cycling exposure (e.g., as for example involving cycling between $-20°$ F. or $-28.9°$ C. and $180°$ F. or $82.2°$ C.).

Naturally, for end-use applications wherein exposure to wide temperature variations will not occur or wherein a minor or moderate amount of warping or bowing can be tolerated, the above-discussed balancing between the relative CLTE values and the relative thicknesses as between the opposing thermoplastic polymer surface layers can become unnecessary and immaterial.

The composite paper core layer generally is from about 0.1 to 12.7 mm (about 4 to about 500 mils) for a single thickness, preferably from about 0.2 to 6 mm (about 8 to about 240 mils), more preferably from about 0.4 to about 2 mm (about 16 to about 80 mils and most preferably from about 0.5 to about 1.5 mm (about 20 to about 60 mils) in thickness. If two such composite paper layers are adhesively joined as above explained the resulting laminate may have a total composite paper layer thickness twice as large as above.

The indicated composite paper core layer can be conveniently prepared in flat sheet form using conventional paper making equipment and techniques. Thus, for example, Fourdrinier paper machines can suitably be used for making said core material in thicknesses up to about 2 mm (80 mils). Cylinder paper machines can be employed for making said core material in up to about 3 mm (125 mils) thicknesses and millboard machines can be used for thicknesses of up to 12.7 mm (500 mils) and greater.

In end-use applications involving relatively large, deep-drawn three-dimensional articles such as pickup truck toppers, bath tubs, hot tubs, etc., it is generally preferred to prepare the indicated composite paper core layer in the preformed shape of the article to be prepared therefrom (e.g., using a porous form or mold to dewater the aqueous composite papermaking slurry in the shape of the desired article and subsequent by drying same) and thereafter applying (e.g., via vacuum forming, plug molding, etc.) the desired thermoplastic polymer layers thereto.

As indicated above, the multilayered articles hereof can be conveniently prepared in the form of flat sheet materials and can then, if desired, be subsequently thermoformed via the application of heat and pressure into formed or shaped 3 dimensional articles. Alternatively, however, the present materials can also be initially prepared in the form of shaped articles such as pipes, tubes, channels and other shaped profiles via profile extrusion techniques wherein the composite paper is manipulated into the desired shape via an appropriately designed mandrel or forming die and is thereafter coated with molten polymer or wherein the polymer-coated composite paper is formed into the desired profile following extrusion coating but prior to polymer solidification.

In those instances wherein extrusion coating or heat lamination techniques are employed, it is generally advisable to employ composite papers containing only relatively low levels of moisture or other volatiles components (and of components that decompose upon heating to the coating or lamination temperature employed) in order to avoid bubbling or blistering caused by trapped gases within the laminated article. Alternatively, the composite paper can be preheated prior to the coating or laminating operation in order to drive off excess moisture or other volatiles prior to contacting said paper with the molten or heated thermoplastic surface layers.

It can additionally be noted that it is generally advisable, when heat lamination or extrusion coating techniques (and especially in the case of the latter) are used for the preparation of the subject multilayer articles hereof, to employ composite papers having delamination resistance values more toward the higher end of the ranges taught hereinbefore [i.e., at least about 0.5 lb/in (87.3 N/m), preferably at least about 0.67 lb/in (117 N/m) and most preferably at least about 1 lb/in (175 N/m)]. Such is generally desirable since said techniques with their attendant elevated temperatures of necessity generate higher heating/cooling related stresses within such articles during the manufacture thereof than does lower temperature operations such as adhesive bonding techniques.

In one embodiment of the invention, the thermoplastic resins desirably comprise weatherable impact resistant polymers such as polyvinyl chloride or rubber modified copolymers of styrene and acrylonitrile wherein the rubber comprises EPDM or acrylate rubber. It is not necessary that both resin layers be identical, however, generally the least amount of bending forces are placed on the composite structure during thermal cycling where both resins are at least within the above identified ratios of linear coefficients of thermal expansion.

As has been noted above, one particularly advantageous feature of the subject structural articles is that they have substantially lower coefficients of linear thermal expansion than the thermoplastic polymers used in their preparation while still retaining the desirable physical properties of said thermoplastic polymers. Such being the case, said structural articles are substantially better suited than their all thermoplastic polymer counterparts for various end uses (such as, for example, various outdoor end-use applications) which involve exposure to relatively wide swings or variations in the ambient temperature. Accordingly, end-use applications for which such articles are well suited include various outdoor construction, recreation and transportation-related uses such as in the manufacture of siding and/or trim for residential and/or commercial buildings, exterior door and window facings, guttering, body panels or other parts for motor vehicles such as automobiles, motorhomes, trucks, busses, boats, snowmobiles, off-road recreational vehicles, aircraft, etc. as well as various indoor applications that may nonetheless involve relatively wide temperature swing exposure such as, for example, hot and cold water piping, shower stalls, bath tubs, hot tubs and spas, kitchen and bathroom sinks, housing for heat-generating appliances, and the like.

In addition to the foregoing, the structural articles hereof are also suitable for use in applications not involving wide temperature variations such as for example in interior building panels, office dividers, interior doors and trim, etc. While the reduced CLTE characteristics of such articles may not be a necessity in such applications, other desirable characteristics which can be achieved with such articles such as, for example, flame barrier properties and the like can render them highly desirable and advantageous for use in such interior applications.

Naturally, the most desirable overall thickness of the structural articles hereof can vary substantially as a function of the actual end-use application which may be of interest. Thus, as a general rule, relatively thinner gauge materials [such as, for example, from about 20 to about 100 mils (0.51 to 2.54 mm), preferably 30 to 60 mils (0.76 to 1.52 mm), in overall thickness] will generally be employed for non-loadbearing and/or decorative applications such as siding and trim for buildings, guttering, soffitts, etc. On the other hand, formed or flat exterior body parts or panels of motor vehicles, recreational vehicles, etc. will generally employ somewhat thicker versions of the subject materials, typically within the range of from about 1 to about 3.6 mm (preferably from about 1.5 to about 2.5 mm) in overall thickness. Even thicker versions (e.g., from about 3.8 to about 12.7 mm in overall thickness) of the subject materials will generally be employed for the manufacture of articles such as pickup truck toppers, spas, boat hulls, and the like.

Having described the invention, the following examples are provided as further illustrative thereof and are not be construed as limiting.

EXAMPLE 1

A sheet 0.03 inches (0.76 mm) thick of EPDM modified styrene acrylonitrile resin available from The Dow Chemical Company under the trademark Rovel ™ 401, was laminated on both sides of a composite paper also 0.03 inches (0.76 mm) in thickness. The composite paper was obtained from Congoleum Inc. and is available under the tradename Whiteshield II ™. The composite paper has a density of 1040 kg/m$^3$, a tensile strength at room temperature of 71.85 kPa and a Tabor Stiffness (regular) of 160. The thermoplastic sheets were laminated to both sides of the composite paper using a temperature of 300° F. (150° C.) and a pressure of 1,000 lbs. sq. ft. (47.90 kPa) for a time of 5 minutes. The final structural laminate has a thickness of 0.093 inches (2.4 mm). When exposed to thermocycling for 24 cycles between −40° C. and +71° C. the laminate did not show any signs of delamination and showed no loss of physical properties compared to samples not exposed to thermal cycling.

EXAMPLE 2

A structural sheet material was prepared by adhering the thermoplastic sheet materials and composite paper materials previously described in Example 1 by the use of an urethane adhesive. The adhesive formulation was a two component formulation. One component comprised 82.35 weight percent of an acrylate modified polyol available from The Dow Chemical Company (XUS-16503), 9.9 weight percent propylene glycol, 7.5 weight percent of an amine terminated polyether triol of 440 molecular weight (Jeffamine T-403 available from Texico Inc.) and 0.25 weight percent of triethylene diamine as a 33 percent solution in dipropylene glycol (Dabco 33LV available from Air Products). The isocyanate component comprised 63 weight percent Isomate ® 181 (available from The Dow Chemical Company) and 37 weight percent isocyanate XAS 10971.05, available from The Dow Chemical Company. The isocyanate side and polyol side were combined and mixed in a ratio of 1 to 1 by volume. The adhesive was applied to both the thermoplastic resin sheets (Rovel ™ 401) and composite paper. The laminate was pressed (47.9 kPa, 30 sec) and cured for 24 hours at room temperature.

When tested under heat cycling conditions as in Example 1, the structural sheet material did not show any evidence of delamination.

EXAMPLE 3

A structural sheet material was prepared utilizing the technique of Example 1 excepting that the thermoplastic resin was polycarbonate in the form of a sheet material having a thickness of 2 mm (0.079 inch). The three layer structural sheet material was prepared by compression lamination at 350° F. (177° C.).

When tested according to the technique of Example 1, no evidence of delamination was observed.

EXAMPLE 4

A structural sheet material was prepared according to the techniques of Example 1 excepting that the thermoplastic resin employed was an ABS resin (XU74050.00 available from The Dow Chemical Company). The laminate was prepared by compression lamination at a temperature of 150° C., a pressure of 1,000 lbs per sq. ft. (47.9 kPa), and a compression time of 1 hour.

The resulting multilayered sheet material, when tested according to the technique of Example 1, showed no evidence of delamination.

EXAMPLE 5

In this example, a series of 3 layer sheet materials are prepared which are similar to that of Example 1 except that the EPDM modified styrene acrylonitrile copolymer (AES) surface layers are 0.01 inch (0.25 mm) thick in each instance and composite paper layers of different thicknesses, i.e. 0.035 inch (0.89 mm), 0.05 inch (1.27 mm) and 0.07 inch (1.78 mm) are employed.

The samples are prepared by compression lamination at 300° F. (150° C.) and about 15,000 lbs/ft² (720 kPa) for 8 minutes.

Physical properties for the resulting laminated sheet materials are summarized in Table I along with those of a single layer sheet of the EPDM modified styrene acrylonitrile copolymer alone. As can be seen, the coefficients of linear thermal expansion (CLTE's) of the laminates are notably lower than that of the single layer copolymer sheet material.

TABLE I

| | Machine Direction/ Cross Machine Direction | Sample Number | | | Plastic Sheet Comparison |
|---|---|---|---|---|---|
| | | 5-1 | 5-2 | 5-3 | |
| Composite Paper Thickness, Mils (mm) | | 35 (.89) | 50 (1.27) | 70 (1.78) | None |
| AES Thickness, Mils, per Surface Layer (mm) | | 10 (.25) | 10 (.25) | 10 (.25) | 85 (total) (21.6) |
| Tensile Yield, psi (MPa) | MD | 3500 (24.1) | 3500 (24.1) | 3100 (21.4) | 3900 (26.9) |
| | CMD | 3400 (23.4) | 3100 (21.4) | 2900 (20.0) | |
| Tensile ultimate, psi (MPa) | MD | 3600 (24.8) | 3500 (24.1) | 3100 (21.4) | 3100 (21.4) |
| | CMD | 3400 (23.4) | 3100 (21.4) | 2900 (20.0) | |
| Yield Elongation (%) | MD | 3.8 | 5.6 | 5.7 | 2.3 |
| | CMD | 3 | 4.8 | 5.7 | |
| Ultimate Elongation (%) | MD | 5.2 | 5.6 | 5.7 | 16.2 |
| | CMD | 5.8 | 5.2 | 6 | |
| Tensile Modulus, psi × $10^5$ (GPa) | MD | 1.54 (1.06) | 1.49 (1.03) | 1.2 (.83) | 2.3 (1.59) |
| | CMD | 1.56 (1.08) | 1.47 (1.01) | 1.21 (.83) | |
| Flex Strength, psi (MPa) | MD | 5710 (39.4) | 6080 (41.9) | 5580 (38.5) | 6500 (44.8) |
| | CMD | 6230 (43.0) | 6090 (42.0) | 5830 (40.2) | |

TABLE I-continued

| | Machine Direction/ Cross Machine Direction | Sample Number | | | Plastic Sheet Comparison |
|---|---|---|---|---|---|
| | | 5-1 | 5-2 | 5-3 | |
| Flex Modulus, psi × 10⁵ (GPa) | MD | 2.73 (1.88) | 2.61 (1.8) | 2.27 (1.57) | 2.82 (1.94) |
| | CMD | 2.87 (1.98) | 2.71 (1.87) | 2.43 (1.68) | |
| CLTE, × 10⁻⁵ in/in °F. (× 10⁻⁵ m/m °C.) | MD | 3.35 (6.03) | 3.1 (5.58) | 2.82 (5.08) | 5.2* (9.36) |
| | CMD | 3.3 (5.94) | 3.13 (5.63) | 2.69 (4.84) | 5.8 (10.4) |
| Gardner Impact in-lbs −20° F. (−28.9° C.) (J) | | 2.9 (.33) | 14 (1.58) | 5 (.56) | 200 (22.4) |
| Gardner Impact in-lbs 73° F. (22.8° C.) (J) | | 43 (4.84) | 52 (5.89) | 57 (6.45) | 230 (26.0) |
| Gardner Impact in-lbs- 160° F. (71.1° C.) (J) | | 39 (4.42) | 54 (6.11) | 51 (5.77) | Not Determined |

*CLTE of compression molded fully stress-relieved AES Plastic sheet is 4.4 × 10⁻⁵ in/in °F.

EXAMPLE 6

In this example an extrusion coating procedure is employed to prepare a series of samples, each having a 0.035 inch (0.89 mm) core layer of the Congoleum Whiteshield II ™ composite paper and having either 0.02 inch (0.5 mm), 0.025 inch (0.64 mm) or 0.03 inch (0.76 mm) layers of thermoplastic resin applied to both surfaces of said composite paper. In each instance, one of the surface layers is weatherable AES resin and the other surface layer is an ABS resin (MAGNUM® 950 ABS resin from The Dow Chemical Company) having a CLTE essentially identical to that of the AES resin.

In carrying out the extrusion coating procedure, a melt temperature of from 450° to 470° F. (232°–243° C.) is employed for each of the respective resin materials (i.e., the AES and the ABS) and a two step approach is employed wherein a first resin layer is initially applied to one side of the composite paper core and the second resin layer is subsequently applied to the other side of said composite paper.

In carrying out each coating step on the respective sides of the paper, a layer of molten polymer from the extruder is applied to the paper surface in the nip of a set of appropriately spaced rollers under moderate pressure with the roller temperature being set at 180° to 210° F. (82°–99° C.), after which the coated paper is cooled or permitted to cool to room temperature.

Physical properties of the resulting laminate samples are set forth in Table II along with those of a 0.1 inch (2.54 mm) single layer sheet of the AES resin for comparative purposes.

TABLE II

| | Sample Number | | | AES Plastic Sheet Comparison |
|---|---|---|---|---|
| | 6-1 | 6-2 | 6-3 | |
| Composite Paper Thickness, Mils (mm) | 35 (.89) | 35 (.89) | 35 (.89) | None |
| AES Top Layer Thickness | 20 (.51) | 25 (.64) | 30 (.76) | 100 (total) (2.51) |
| ABS Bottom Layer Thickness | 20 (.51) | 25 (.64) | 30 (.76) | |
| Tensile Yield, psi (MPa) | 3705 (25.5) | 3770 (26.0) | 3890 (26.8) | 4000 (27.6) |
| Tensile ultimate, psi (MPa) | 2972 (19.6) | 3585 (24.7) | 3270 (22.5) | 3200 (22.1) |
| Tensile Modulus, psi × 10⁵ (GPa) | 1.75 (1.21) | 1.79 (1.23) | 1.9 (1.31) | 2.4 (1.65) |

TABLE II-continued

| | Sample Number | | | AES Plastic Sheet Comparison |
|---|---|---|---|---|
| | 6-1 | 6-2 | 6-3 | |
| Yield Elongation (%) | 3.2 | 3.1 | 3.1 | 2.4 |
| Ultimate Elongation (%) | 4.7 | 4 | 4.9 | 11 |
| Flex Strength, psi (MPa) | 6370 (43.9) | 6670 (46.0) | 6520 (45.0) | 7200 (49.6) |
| Flex Modulus, psi × 10⁵ (GPa) | 2.41 (1.66) | 2.63 (1.81) | 2.28 (1.57) | 2.7 (1.86) |
| CLTE, × 10⁻⁵ in/in °F. (× 10⁻⁵ m/m °C.) | 3.4 (6.12) | 3.8 (6.84) | 4 (7.2) | 5.2 (9.36) |

Immersion of Sample 6-1 in water at room temperature (20° C.) for 72 hours, freeze/thaw cycling through 12 cycles and flex fatigue testing (½ inch-12.7 mm) deflection) through 3 million cycles dry or 5 million cycles wet are also observed to produce no noticeable deterioration in the laminate sample.

EXAMPLE 7

In this example, two different composite paper materials are prepared corresponding to Composite Papers A and B as set forth below.

| INGREDIENT | % By Weight (Solids Basis) |
|---|---|
| Composite Paper A | |
| Talc | 75 |
| Bleached Kraft | 7 |
| ⅛″ (3 mm) E-Glass | 3 |
| Vinylidene Chloride/Butadiene/Acid Latex* | 15 |
| Composite Paper B | |
| Magnesium Hydroxide | 75 |
| Bleached Kraft | 7 |
| ⅛″ (3 mm) E-Glass | 3 |
| Vinylidene Chloride Butadiene/Acid Latex* | 15 |

*Vinylidene Chloride/Butadiene/Fumaric Acid/Acrylic Acid (50/48/1/1)

The resulting composite papers have a thickness of 0.07 inch (1.78 mm), a density of about 60 lb/ft³ (960 kg/m³) and a room temperature tensile strength of about 1500 psi (71.85 kPa).

Three layered sheet materials are made using each of said composite papers by compression laminating 0.02 inch (0.5 mm) surface layers of AES resin to each side of said composite papers.

The resulting sheet materials are then subjected to flame barrier testing by clamping 6" (15.2 cm) square test specimens of same in a vertical position and applying a natural gas flame to the vertical surface thereof and observing how long it takes for the flame to burn through the sample.

The sheet materials in question are observed to tolerate exposure to the flame for as much as 2 hours without experiencing flame breakthrough. Naturally, however, it will be recognized by those skilled in the art that the results of this type of laboratory testing may not reflect actual performance results under actual fire conditions nor hazards that may be presented by these or any other materials under actual fire conditions.

EXAMPLE 8

In this example a composite paper having a thickness of 0.04 (1.02 mm) inch and a density of 70 lbs/ft³ (1120 kg/m3) is prepared on a pilot paper machine pursuant to the formulation details for Composite Paper A in Example 7.

The paper is extrusion laminated with a 0.025 inch (0.64 mm) layer of AES resin on one side and a 0.025 inch (0.64 mm) layer of ABS resin on the other. The AES layer is then surface coated with a 0.0003 inch (0.008 mm) clear acrylic coating for enhanced gloss and scratch resistance and the resulting laminate sample (Sample 8A) is subjected to physical property testing, the results of which are summarized in Table III below.

Physical properties for a similar laminate (Sample 8-B) prepared using the above-described Whiteshield II ™ composite paper from Congoleum, Inc. are also presented in Table III for comparative purposes.

TABLE III

| | Sample 8-A | Sample 8-B |
|---|---|---|
| Tensile Yield, psi | 3090/2740* | 3770/3390 |
| (MPa) | (21.3/18.9) | (26.0/23.4) |
| Tensile Ultimate, psi | 1060/1060 | 3590/2960 |
| (MPa) | (7.3/7.3) | (24.8/20.4) |
| Elongation Yield (%) | 2.2/2.5 | 3.0/3.1 |
| Elongation Ultimate (%) | 26/20 | 4.0/8.9 |
| Tensile Modulus, $\times 10^5$ psi | 2.05/1.54 | 1.8/1.68 |
| (GPa) | (1.41/1.06) | (1.24/1.16) |
| Flex Strength, psi | 4420/4350 | 6670/6170 |
| (MPa) | (30.5/30.0) | (46.0/42.5) |
| Flex Modulus, $\times 10^5$ psi | 2.34/2.31 | 2.63/2.31 |
| (GPa) | (1.61/1.59) | (1.81/1.59) |
| Instrument Impact, in-lbs | 90 | 110 |
| (J) | (10.2) | (12.5) |
| CLTE, $\times 10^{-5}$ in/in °F. | 3.0/3.9 | 3.8/4.5 |

TABLE III-continued

| | Sample 8-A | Sample 8-B |
|---|---|---|
| ($\times 10^{-5}$ m/m °C.) | (5.4/7.02) | (6.8/8.1) |

*MD/CMD

EXAMPLE 9

In this example, a series of laminate samples are prepared using a 0.035 inch (0.89 mm) thick Congoleum Whiteshield II ™ composite paper as the core layer and using either 0.020 or 0.030 inch (0.5 or 0.76 mm) thicknesses of different thermoplastic resins, i.e., polyethylene (PE), polypropylene (PP) or polyvinyl chloride (PVC) as the surface layers on both sides (i.e., using the same resin on each side) of said composite paper.

Compression lamination is employed to prepare the various samples and the laminating conditions and thermoplastic resin layer thickness for each of the samples are presented in Table IV. Also presented in Table IV are the CLTE values for the resulting laminate samples.

TABLE IV

| Sample Number | Surface Layer Resin | Thickness - (in.) | Molding Conditions Temp. °F. (°C.) | Pressure psi (MPa) | Time Min. | CLTE $\times 10^{-5}$ in/in °F. ($\times 10^{-5}$ m/m °C.) MD | CMD |
|---|---|---|---|---|---|---|---|
| 9-1 | PE | 0.03 | 300 (150) | 21 (.14) | 8 | 5.0 (9) | 5.3 (9.54) |
| 9-2 | PP | 0.02 | 310 (155) | 21 (.14) | 8 | 3.4 (6.12) | 4.1 (7.38) |
| 9-3 | PVC | 0.02 | 340 (170) | 70 (.48) | 8 | 2.9 (5.22) | 3.2 (5.76) |
| 9-4 | PP | 0.03 | 340 (170) | 70 (.48) | 8 | 3.5 (6.30) | 3.9 (7.02) |

Since the CLTE for polyethylene, polypropylene and polyvinyl chloride is 8.3, 6.2 and $3.3 \times 10^{-5}$ in/in °F. (14.94, 11.16 and $5.94 \times 10^{-5}$ m/m °C.), respectively, it can be seen that the presence of the highly filled composite paper core substantially reduces the CLTE values of thermoplastic resin materials such as polyethylene and polypropylene which have inherent CLTE values substantially greater than materials of construction conventionally employed in end-uses involving exposure to relatively wide swings in the ambient usage temperature. The observed CLTE reduction for the PVC sample is less dramatic presumably due to the lower starting point CLTE value for the PVC material and/or due to suspected marginal interlayer adhesion of the sample.

Example 10

In this example, two composite paper sheets are prepared wherein a powdered polyethylene or polyethylene fiber is included in the composite paper recipe. The compositional details of each of the composite sheet samples are as follows:

| | Sample Number | |
|---|---|---|
| Ingredient (wt. % solids) | 10-1 | 10-2 |
| Cellulose | 7.0 | 7.0 |
| Talc | 70.0 | 75.0 |
| PE Powder | 10.0 | — |
| PE Fiber | — | 5.0 |
| Latex Binder (54 Styrene/45.1 Butadiene/0.9 | 13.0 | 13.0 |

-continued

| Ingredient (wt. % solids) | Sample Number | |
|---|---|---|
| | 10-1 | 10-2 |
| Fumaric Acid) | | |

Thermoforming experiments conducted on the resulting composite paper samples indicate that they are more readily amendable to thermoforming than composite papers not containing the powdered or fibrous polyethylene ingredient. More specifically, the Sample 10-1 and 10-2 papers split less and retain their formed shape better than a similar paper not containing any fibrous or powdered polyethylene ingredient.

When 3 layer laminates are prepared using the Sample 10-1 and 10-2 papers as the core layers, 0.035 inches (0.89 mm) in thickness, and having 0.02 inch (0.51 mm) AES layers compression laminated to each surface thereof, the resulting laminates have CLTE values of $4.4 \times 10^{-5}$ in/in °F. ($7.92 \times 10^{-3}$ m/m °C.) and $4.2 \times 10^{-5}$ in/in °F. ($7.6 \times 10^{-5}$ m/m °C.), respectively, which values are approximately 10 to 20 percent smaller than that of a homogeneous, single layer sheet of the unfilled AES resin itself but are greater than CLTE values obtained when comparable laminates are prepared using composite papers not containing the polyethylene powder or fiber material. The tensile strength of such laminates is lower than their polyethylene-free counterparts. The flex strength of such laminates, however, is substantially higher than that of said counterparts.

Example 11

In these examples, three different commercially available composite paper samples are employed to prepare 3 layered structural sheet materials having 0.03 (0.76 mm) inch surface layers of an AES resin compression molded (350° F., 177° C., and 80 psi, 0.55 kPa, for 8 minutes) on each side thereof. The three composite papers employed are as follows:

| | Composite Paper Properties | | | | | | |
|---|---|---|---|---|---|---|---|
| | Caliper | Density | Tensile psi (MPa) | | Elongation (%) | | Tabor |
| Composite Paper Sample | Mils (mm) | Lbs./Ft.³ (kg/m³) | RT 1 | 350° F. (177° C.) | RT 1 | 350° F. (177° C.) | Stiffness 2 |
| Sample #1 | 29 (0.74) | 59.5 (953.2) | 1075 (7.4) | 590 (4.1) | 5.4 | 3.3 | 125 |
| Sample #2 | 29 (0.74) | 56 (897.1) | 1630 (11.2) | 380 (2.6) | 1.1 | 1.3 | 308 |
| Sample #3 | 23 (0.58) | 73.6 (1179.1) | 1200 (8.3) | 577 (4.0) | 6.2 | 3.4 | 140 |

1 RT = Room Temperature
2 Normalized to a 30 mil (0.030 inch, 0.76 mm) thickness value.

Physical properties of the resulting laminated sheet materials are shown in Table V.

TABLE V

| | Sample Number | | |
|---|---|---|---|
| Property | 11-1 | 11-2 | 11-3 |
| Tensile Yield, psi (MPa) | 3810/4190* (26.3/28.9) | 3950/3700 (27.2/25.5) | 4160/4140 (28.7/28.5) |
| Tensile Ultimate, psi (MPa) | 3450/3840 (23.8/26.5) | 3670/3460 (25.3/23.9) | 3820/3570 (25.2/24.4) |
| Elongation Yield (%) | 2.6/2.6 | 2.7/2.7 | 2.6/2.8 |
| Elongation Ultimate (%) | 7/3.6 | 5/5 | 4/8 |
| Tensile Modulus, $\times 10^{-5}$ psi (GPa) | 1.83/1.90 (1.26/1.31) | 1.88/1.59 (1.3/1.1) | 2.04/1.96 (1.4/1.35) |
| Flex Strength, psi (MPa) | 6850/6735 (47.2/46.4) | 6721/6700 (46.6/46.2) | 6330/6485 (43.6/44.7) |
| Flex Modulus, $\times 10^{-5}$ psi (GPa) | 3.09/3.12 (2.13/2.15) | 3.02/2.98 (2.08/2.05) | 2.79/2.95 (1.92/2.03) |
| Instrument Impact, in-lbs (J) | 121 (13.7) | 127 (14.3) | 129 (14.6) |
| CLTE, $\times 10^{-5}$ in/in °F. ($\times 10^{-5}$ m/m °C.) | 3.65/4.50 (6.57/8.1) | 4.50/4.72 (8.1/8.5) | 4.21/4.75 (7.58/8.55) |

*Data appears as MD/CMD

EXAMPLE 12

In this example, multilayered sheet materials are prepared wherein each of the thermoplastic surface layers are composed of 2 distinct layers of different thermoplastic polymers.

In both samples the sample size is 12"×12" (0.3 m×0.3 m), the composite paper core layer is a 70 mil (0.07 inch, 1.78 mm) thick sheet of Congoleum Whiteshield II ™, sample preparation is by way of compression lamination at 350° F. (177° C.) and 80 psi (0.55 kPa) for 8 minutes, and the thermoplastic surface layers have a total thickness of 40 mils (1.02 mm, 0.04 inch) and is composed of a 20 mil (0.51 mm) layer of PVC (CLTE = $3.3 \times 10^{-5}$ in/in °F., $5.94 \times 10^{-5}$ m/m °C.)) and a 20 mil (0.51 mm) layer of AES (CLTE = $5.2 \times 10^{-5}$ in/in °F., $9.3 \times 10^{-5}$ m/m °C.).

In sample 12-1, the thermoplastic polymer surface layers are arranged in a symmetrical fashion such that the AES layer is the outermost layer on both sides and the PVC layer is positioned between the outermost AES layers and the composite paper layer on each side of the laminate.

In Sample 12-2, the thermoplastic polymer surface layers are positioned non-symmetrically such that the PVC layer is the outermost surface layer on one side of the laminate sample and the AES layer is the outer surface layer on the other side of said laminate.

The symmetrical sample (Sample 12-1) has no tendency to buckle or curl upon cooling following its preparation nor when heated to 180° F. (82° C.) in an oven.

Sample 12-2 (i.e., the unsymmetrical sample) has a mild tendency to curl (lifting 1/16th of an inch, 1.59 mm off a flat surface in the center of the 12"×12", 0.3 m×0.3 m, sample) upon cooling to room temperature following its preparation. The sample flattens to within 1/64th of an inch of a flat surface when heated to 180° F. (82° C.) and returns to its original 1/16th, 1.59 mm inch curvature upon cooling back to room temperature.

EXAMPLE 13

In this experiment, a 3 layered sheet material is prepared via compression lamination [400° F. (204° C.) and 83 psi (0.57 kPa) for 8 minutes] having a 35 mil (0.035 inch, 0.89 mm) core layer of Congoleum Whiteshield II ™ composite paper and having one 20 mil (0.02 inch, 0.5 mm surface layer formed from a 35/65 weight ratio blend of an ABS resin and a polycarbonate resin (CLTE of said blend=$4.1 \times 10^{-5}$ in/in °F.=$7.3 \times 10^{-5}$ m/m°C.) and having as the other surface layer a 20 mil (0.02 inch=0.51 mm) sheet of an AES resin (CLTE=$4.4 \times 10^{-5}$ in/in °F.=$7.92 \times 10^{-5}$ m/m °C.).

The resulting sheet material sample (sample size=10"×12"=0.25 m×0.3 m) is observed to curl, lifting 5/16" (7.94 mm) above a flat surface in the center, upon cooling to room temperature following its preparation. The magnitude of the curling is observed to worsen (i.e., increasing to a 3/4", 19.1 mm lift) upon heating the sample to 180° F. (82° C.).

From this experiment (wherein the ratio of the CLTE's of the respective thermoplastic polymer surface layers are reasonably well balanced at $4.4 \times 10^{-5}/4.1 \times 10^{-5} = 1.07$), it can be seen that it is important to very closely match the CLTE's of the respective polymer surface layers when said surface layers are of equal thickness in order to avoid buckling or curling of the resulting laminate during the manufacture thereof and/or during subsequent thermal cycling.

When this experiment is repeated using a relatively thinner layer of the AES resin on the side opposite of the ABS/polycarbonate resin blend layer, the tendency of the resulting sheet material to curl upon thermal cycling is dramatically reduced.

COMPARATIVE EXPERIMENT 1

In this experiment, a 3 layered sheet material is prepared via compression lamination [325° F. (163° C.) and 83 psi (0.57 kPa) for 8 minutes] having a 35 mil (0.035 inch=0.89 mm) core layer of Congoleum Whiteshield II ™ composite paper and two 30 mil (0.03 inch=0.76 mm) surface layers one of which is composed of high density polyethylene (CTLE=$8.3 \times 10^{-5}$ in/in °F.=$14.94 \times 10^{-5}$ m/m °C.) and the other of which is composed of general purpose polystyrene (CTLE=$4.5 \times 10^{-5}$ in/in °F.=$8.1 \times 10^{-5}$ m/m °C.).

Upon cooling to room temperature following its preparation, the resulting 12"×12" (0.3 m×0.3 m) laminate sample is badly bowed lifting 1¾" (44 mm) in its center above a flat surface upon which it is placed. The extent of said bowing worsens, increasing to a 2¼" (57 mm) lift, upon heating the sample to 180° F. (82° C.) and worsens even further (to a 3"=76 mm lift) upon cooling the sample back down to room temperature (73° F.=23° C.).

What is claimed is:

1. A multilayer structural article comprising (1) a composite paper core layer which has a thickness of from 0.4 to about 4 millimeters and which has two major surfaces and (2) a thermoplastic polymer layer adhered to each major surface of said core layer, said thermoplastic polymer layers each comprising one or more thermoplastic polymers and from 0 to about 25 weight percent, based on the weight of said thermoplastic polymer, of inorganic fibrous or particulate reinforcing or filler material; provided further that the ratio of the coefficient of linear thermal expansion (CLTE) of one of the thermoplastic polymer layers divided by the coefficient of linear thermal expansion of the other thermoplastic polymer layer is in the range of 0.85 to 1.15; and the composite paper core layer of said article has a resistance to delamination of 0.2 lbs/in (35 N/m) or greater.

2. A structural article according to claim 1 wherein the thermoplastic polymer is selected from the group consisting of homopolymers of styrene, rubber modified homopolymers of styrene, copolymers of styrene and acrylonitrile, rubber modified copolymers of styrene and acrylonitrile, polymethyl methacrylate, polycarbonate, polyvinylchloride, polyethylene, polypropylene and blends thereof.

3. A structural article according to claim 1 wherein both thermoplastic polymer layers comprise the same thermoplastic polymer and have substantially the same thickness.

4. A three layer structural sheet material comprising a central core layer comprising a composite paper having two major surfaces, and two outer surface layers adhered to both major surfaces of a central core layer, said outer surface each comprising a thermoplastic resin and devoid of reinforcing fibrous or filler material; provided further that the ratio of the linear coefficient of thermal expansion of one surface layer thermoplastic resin divided by the linear coefficient of thermal expansion of the other surface layer thermoplastic resin is in the range of 0.95 to 1.05; and the composite paper has a density from 20 to 250 lbs/ft³ (320 kg/m³ to 4000 kg/m³), a tensile strength at room temperature of at least 200 lbs/in² (9.58 kPa), a resistance to delamination of at least 0.57 lbs/in (100 N/m), and a Tabor Stiffness of from 20 to 250.

5. The structural article of claim 1 wherein each thermoplastic polymer layer, individually, has a thickness of from about 0.1 to about 2.5 mm.

6. The structural article according to claim 1 wherein the composite paper core layer comprises, on a total composite paper weight basis, (a) from about 1 to about 30 weight percent of a water dispersible organic fiber, (b) from about 2 to about 30 weight percent of water insoluble, film forming organic polymer and (c) from about 60 to about 95 weight percent of a particulate, non-fibrous inorganic filler.

7. The structural article of claim 6 wherein the composite paper core layer further comprises, on a composite paper weight basis, from about 1 to about 5 weight percent of glass fibers.

8. The structural article of claim 6 wherein the composite paper employed to form the core layer of said article further comprises, on a composite paper weight basis, from about 3 to about 15 weight percent of a normally solid thermoplastic polymer in particulate or fibrous form.

9. The structural article of claim 1 wherein the CLTE ratio of the two thermoplastic polymer layers is from 0.97 to 1.03 and wherein said thermoplastic polymer layers are substantially equal in thickness.

10. The structural article of claim 9 wherein the CLTE ratio of the two thermoplastic polymer layers is from 0.99 to 1.01.

11. The structural article of claim 4 wherein the two thermoplastic resin outer layers are substantially equal in thickness.

12. The structural article of claim 1 wherein the CLTE ratio of the two thermoplastic polymer layers is from 0.95 to 1.05.

13. The structural article of claim 1 wherein the total thickness thereof is from 0.51 to 2.54 mm.

14. The structural article of claim 1 wherein the total thickness thereof is from about 1 to about 3.6 mm.

15. The structural article of claim 1 wherein the total thickness thereof is from about 3.8 to about 12.7 mm.

16. The structural article of claim 1 wherein the thickness of the composite paper core layer is from about 0.5 to about 1.5 mm.

17. The structural article of claim 1 wherein each thermoplastic polymer layer has a thickness of from about 0.1 to about 5 mm.

18. The structural article of claim 1 wherein each thermoplastic polymer layer has a thickness of from about 0.1 to about 0.75 mm.

19. The structural article of claim 1 wherein each thermoplastic polymer layer has a thickness of from about 0.1 to about 1.5 mm.

20. The structural article of claim 19 wherein each thermoplastic polymer layer has a thickness of at least about 0.5 mm.

* * * * *